Jan. 18, 1927.  1,614,800
R. H. MUELLER ET AL
BALL VALVE
Filed Oct. 26, 1925
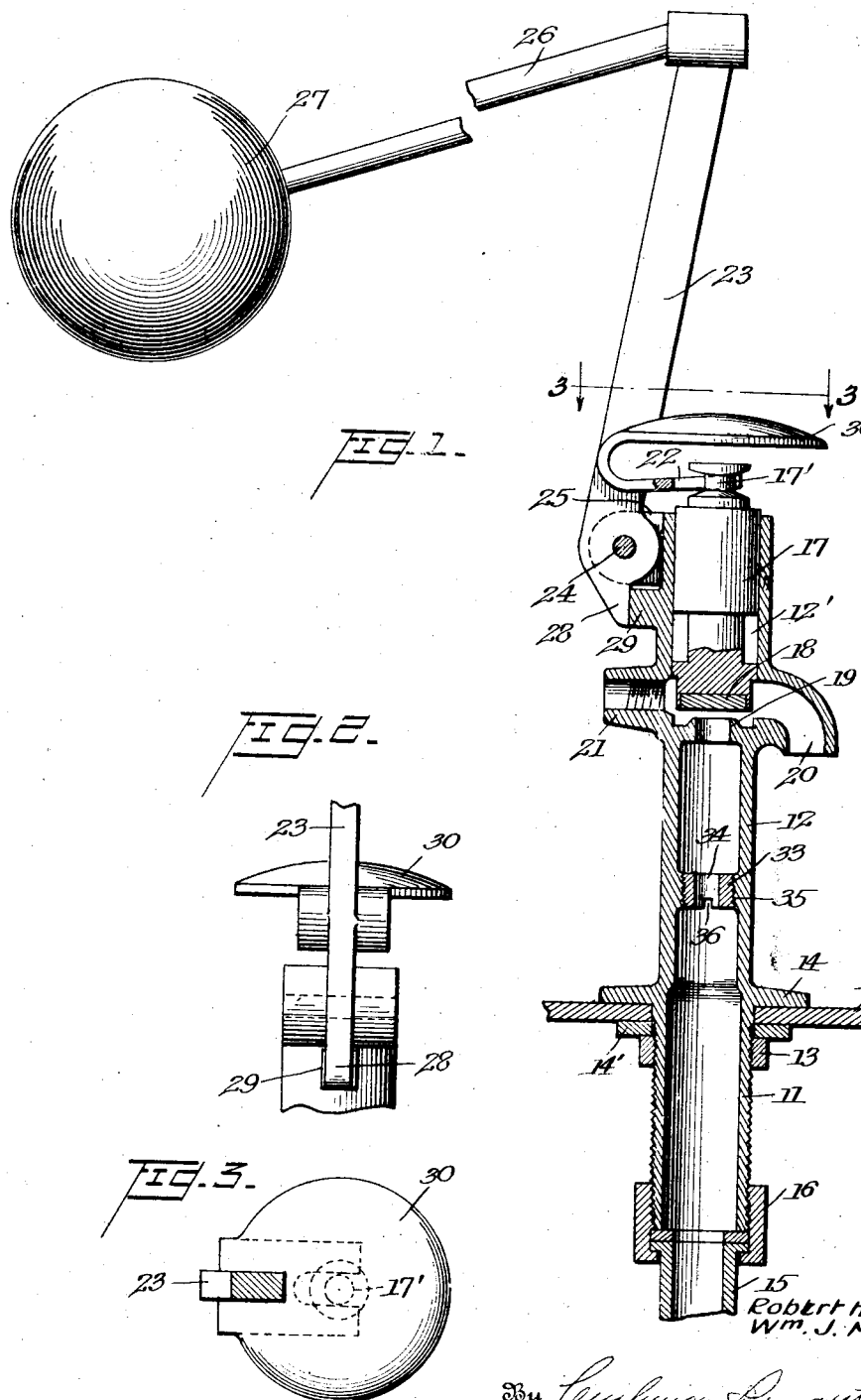
Inventors
Robert H. Mueller
Wm. J. Mix Patented Jan. 18, 1927.

1,614,800

UNITED STATES PATENT OFFICE.

ROBERT H. MUELLER AND WILLIAM J. MIX, OF DECATUR, ILLINOIS, ASSIGNORS TO ADOLPH MUELLER, TRUSTEE, OF DECATUR, ILLINOIS.

BALL VALVE.

Application filed October 26, 1925. Serial No. 64,916.

The present invention relates to valves, and more particularly to float controlled valves of the type ordinarily employed in connection with flush tanks.

An object of the invention is to provide a valve of simplified construction which may be manufactured at a considerable saving in the cost of ordinarily incident to manufacture of valves of this type, and further, to provide a valve which may be readily adapted by the plumber for use with water systems irrespective of the inflow pressure.

Heretofore it has been necessary to manufacture these valves in various sizes and constructed for water systems having specified pressure ranges, since it is important that the water flowing into the flush tank or like receptacle, be suitably regulated to a suitable pressure.

The present invention contemplates the provision in a valve of a flow regulator which may be conveniently adjusted to adapt the valve to any given pressure within a relatively wide range. The means for regulating the flow pressure preferably takes the form of a number of plugs having flow passages or apertures therein of varying size, whereby a plug having a flow passage of any suitable size may be conveniently inserted in the valve casing.

In the accompanying drawing there is shown one preferred embodiment of the invention, and in this drawing:—

Figure 1 is a vertical sectional view taken through the valve casing showing the valve installed.

Figure 2 is an elevational view of a portion of the float operated control lever and the upper portion of the valve casing to which the lever is secured.

Figure 3 is a horizontal section taken on the line 3—3 of Figure 1.

In the drawings, wherein like numerals designate corresponding parts, 10 indicates the lower end of a flush tank or the like, having a suitable aperture through which extends the threaded shank 11 of a valve casing 12, the casing being secured to the tank by means of a lock nut 13 thereon below the wall of the tank and a flange 14, which is pressed against the wall by means of the nut 13, a gasket 14' being inserted between the nut and the undersurface of the tank. The lower end of the shank 11 is secured to a supply pipe 15 in a suitable manner, as by a coupling collar 16, and at its upper end the casing carries a movable valve member 17 having a sliding fit in a chamber 12' and carrying a valve washer 18, which is adapted to bear against a seat 19. Passage of fluid upwardly through the seat 19 is controlled by means of the valve, and when the latter is raised the water makes its egress through a spout 20. The valve casing carries the usual nipple 21, to which may be connected an after-wash tube as is customary in a valve of this type.

The movable valve member 17 projects upwardly through the open upper end of the casing, and has a reduced neck portion 17' which fits between the arms 22 of a forked lug extending laterally from a valve operating and float controlled lever 23, which is pivoted upon a pin 24 carried between laterally projecting lugs 25 on the casing. Above the pivot pin 24 the lever extends upwardly and carries the usual rod 26 having the float ball 27 thereon. Below its pivot the lever carries a downwardly projecting stop lug 28 adapted to engage the stop 29 upon the casing and limit the upward movement of the valve when the float ball 27 descends.

In addition to the valve operating arms 22, the valve lever 23 carries an integral baffle plate or canopy 30, which extends outwardly over the valve casing above the valve member 17 to prevent water which may pass through the chamber 12' and around the valve, from discharging upwardly into the flush tank. Although baffle plates are broadly old in valves of this character, it is to be observed that the plate 30 is formed as an integral part of the float control valve lever 23, and is of sufficient size to remain over the valve casing when the lever 23 is moved to the left to raise the valve. By combining the baffle plate with the valve lever 23 and forming it as an integral part thereof, the assembling and dismantling of the valve is facilitated, and, moreover, since the valve lever is cast in one piece in the control arm and baffle plate, the expense of manufacture is considerably reduced.

A further feature of the invention resides in the provision of a flow regulator, preferably in the valve casing.

As has been hereinbefore stated, the pressure of the water systems in different cities varies, and in order that the water may be delivered to the flush tank at a substantially uniform pressure, it is necessary that the character of the valve be varied for different pressures. In order to facilitate adaptation of the valve to water systems of different pressures, we have provided a readily adjustable flow regulator within the valve casing. In the present instance this regulator takes the form of a plug 33 having a central passageway 34 therethrough and formed peripherally with suitable means such as threading 35 to cooperate with complemental means, in the present instance, threading upon the casing. These plugs may be furnished with flow passages 34 of different sizes, the diameter of the plug being the same in each instance, so that the valve casing and seat for the plug may be of standard dimensions. In the present instance, the plug regulator is formed with a socket or recess 36 to receive a tool such as a screw driver, whereby it may be conveniently positioned in the casing and removed therefrom.

It will be understood, of course, that the plug is assembled with the valve casing before the valve is positioned in the flush tank and the plumber will select a regulating plug having a passageway of a size suitable for the pressure of the particular water system, the flow of which is to be controlled.

Obviously numerous variations may be made within the construction described without departing from the invention which is defined in the following claim.

We claim:

In a valve of the class described, a casing having an opening therein at its upper end, a movable valve member in the casing having a portion projecting from the casing through said opening, and a valve operating lever connected with the portion of said member projecting from said casing by means of an integral slotted arm receiving said member, and an integral baffle plate on said lever above said arm and member, whereby to prevent fluid from being discharged upwardly around said member.

In testimony whereof we have hereunto set our hands.

ROBERT H. MUELLER.
WILLIAM J. MIX.